(12) United States Patent
Smith et al.

(10) Patent No.: US 9,800,773 B2
(45) Date of Patent: Oct. 24, 2017

(54) DIGITAL CAMERA APPARATUS WITH DYNAMICALLY CUSTOMIZED FOCUS RETICLE AND AUTOMATIC FOCUS RETICLE POSITIONING

(71) Applicant: Motorola Mobility LLC, Chicago, IL (US)

(72) Inventors: Brian K Smith, Wellington, FL (US); Valeriy Marchevsky, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 112 days.

(21) Appl. No.: 14/749,841

(22) Filed: Jun. 25, 2015

(65) Prior Publication Data

US 2016/0381268 A1 Dec. 29, 2016

(51) Int. Cl.
*H04N 5/222* (2006.01)
*H04N 5/232* (2006.01)

(52) U.S. Cl.
CPC ..... *H04N 5/23212* (2013.01); *H04N 5/23219* (2013.01); *H04N 5/23293* (2013.01)

(58) Field of Classification Search
CPC .............................. H04N 5/232; H04N 5/235
USPC ............... 348/222.1, 333.01, 333.02, 333.03
See application file for complete search history.

(56) References Cited

U.S. PATENT DOCUMENTS

| 7,248,301 B2* | 7/2007 | Voss | H04N 5/23293 |
| | | | 348/333.04 |
| 7,949,689 B2 | 5/2011 | Fano | |
| 2003/0011684 A1 | 1/2003 | Narayanaswami et al. | |
| 2010/0315526 A1* | 12/2010 | Nakano | G03B 13/36 |
| | | | 348/222.1 |
| 2012/0121240 A1* | 5/2012 | Ueda | G03B 13/36 |
| | | | 396/89 |
| 2013/0278809 A1* | 10/2013 | Itoh | G02B 7/38 |
| | | | 348/333.01 |

(Continued)

OTHER PUBLICATIONS

Stephen Shankland, "Geotagging Links Photos to Locales," CNET News (Sep. 4, 2007), available at: http://www.news.com/Geotagging-links-photos-to-locales/2100-1041_3-6205734.html?tag=item (last visited Jun. 25, 2015).

(Continued)

*Primary Examiner* — Tuan Ho
*Assistant Examiner* — Zhenzhen Wu
(74) *Attorney, Agent, or Firm* — Cygan Law Offices P.C.; Joseph T. Cygan (57) ABSTRACT

An apparatus includes digital camera equipment and a display that provides a viewfinder. A processor that is operatively coupled to the camera equipment, and to the display, controls the camera equipment and the display to provide a custom reticle that defines a region-of-interest having a shape corresponding to an object-of-interest as the object-of-interest appears in the viewfinder. One or more object templates may be stored in memory. The object templates contain location information and size information for one or more objects-of-interest in a geographic region where the apparatus is located. The processor may construct the custom reticle using one or more of the object templates. The processor can determine that an object-of-interest is displayed in the viewfinder and construct a custom reticle for that particular object-of-interest.

23 Claims, 7 Drawing Sheets

(56) References Cited

U.S. PATENT DOCUMENTS

| | | | | |
|---|---|---|---|---|
| 2014/0362255 A1* | 12/2014 | Kuang | ............... | H04N 5/23293 348/231.5 |
| 2015/0138390 A1* | 5/2015 | Tomosada | .......... | H04N 5/23212 348/222.1 |
| 2015/0256740 A1* | 9/2015 | Kalama | .............. | H04N 5/23222 348/222.1 |
| 2016/0198082 A1* | 7/2016 | Choi | ....................... | G06T 5/003 348/333.02 |

OTHER PUBLICATIONS

Elinor Mills, "From PARC, The Mobile Phone As Tour Guide," CNET News (Sep. 28, 2007, Modified Oct. 9, 2007), available at: http://www.news.com/From-PARC,-the-mobile-phone-as-tour-guide/2100-1039_3-6210548.html?tag=item (last visited Jun. 25, 2015).

* cited by examiner

- PRIOR ART -

DIGITAL CAMERA APPARATUS WITH DYNAMICALLY CUSTOMIZED FOCUS RETICLE AND AUTOMATIC FOCUS RETICLE POSITIONING

FIELD OF THE DISCLOSURE

The present disclosure relates generally to digital cameras and other mobile devices that include a digital camera, and more particularly to focusing procedures for a digital camera.

BACKGROUND

Figure 1:
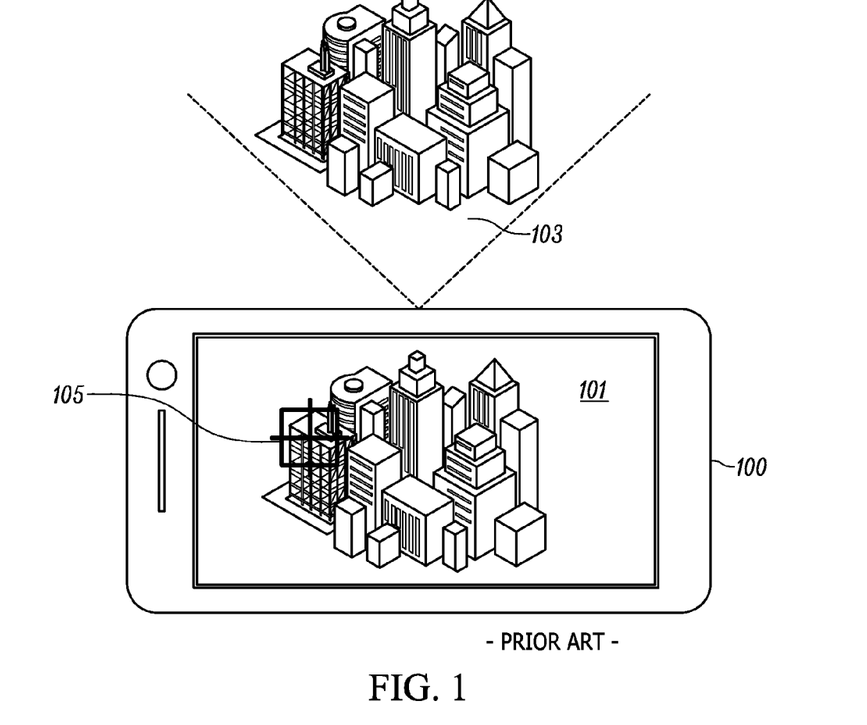
FIG. 1 is a diagram of a mobile device that has an integrated digital camera which operates in accordance with known procedures.

FIG. 1 illustrates a mobile device 100 having an integrated digital camera which operates in accordance with known procedures. The mobile device 100 includes a display 101 that provides a viewfinder for the digital camera feature. The viewfinder is operative to display a scene captured by a lens and camera sensor of the digital camera equipment within a field-of-view 103. A focus reticle 105 may be controlled by a user and moved across or about the scene in the viewfinder and placed upon an object-of-interest, for example a building in a city skyline as illustrated.

For digital camera operation such as discussed in the example of FIG. 1, one of the largest contributors to the amount of time taken to capture an image is the time required to focus on the image to be captured. For example, the focusing procedure may be considered to include several steps: 1) Pointing the digital camera in the general direction of an object-of-interest; 2) Repositioning the digital camera to place the object-of-interest at a desired position on the digital camera's viewfinder; 3) Repositioning the focus reticle onto the object-of-interest; and 4) Performing a focus sweep operation by the digital camera.

Although the first and second steps can be accomplished relatively quickly by a user, the third step requires the user to use both hands, because one hand is required to hold the camera (or mobile device 100) and the second hand is required to position the focus reticle 105. The fourth step is dependent upon the focus technology employed by the digital camera, but may take anywhere from 300 ms to 1 s. Therefore, the third step of moving the focus reticle 105 and waiting for focus to complete, and the fourth step of performing the focus sweep are time consuming and can negatively impact the user's experience.

DETAILED DESCRIPTION

Briefly, the disclosed embodiments provide a digital camera apparatus that can construct a custom reticle within the viewfinder based on a known or determined location of an object-of-interest when the object-of-interest appears within the viewfinder. The disclosed digital camera apparatus is operative to determine its lens position with respect to the object-of-interest using location information and sensor data, and automatically move the custom reticle to a position over the object-of-interest in the viewfinder. The digital camera apparatus may be used in devices that are solely digital cameras or in any of various forms of consumer devices such as mobile phones, laptops, etc., that include integrated camera features.

One disclosed embodiment is an apparatus with camera equipment that includes one or more lenses and one or more camera sensors operative to detect at least three colors. The apparatus includes a display that is operatively coupled to the camera equipment, and that provides a viewfinder for the camera. A processor is operatively coupled to the camera equipment and to the display. The processor is configured to control the camera equipment and the display to provide a custom reticle that defines a region-of-interest having a shape corresponding to an object-of-interest as the object-of-interest appears in the viewfinder.

In some embodiments, the processor is further configured to limit usage of image statistics of a captured image as used by at least one of an auto exposure routine and an auto white balance routine. In other words, processing may be reduced by using only the image statistics corresponding to grid areas falling within a perimeter defined by the custom reticle.

The disclosed apparatus may further include non-volatile, non-transitory memory that is operatively coupled to the processor, and that stores at least one object template. The object template includes location information and size information for the object-of-interest. The processor can construct the custom reticle using the object template stored in memory. The processor is further configured to determine that the object-of-interest is displayed in the viewfinder and, in response, construct the custom reticle.

The apparatus may further include location determination hardware that is operatively coupled to the processor, and a gyroscope which is also operatively coupled to the processor. The processor may be further configured to determine the apparatus's distance from the object-of-interest using location information of the apparatus obtained from the location determination hardware and location information of the object-of-interest contained in the object template. The processor determines the direction of the object-of-interest with respect to a lens of the camera equipment using the gyroscope, and determines that the object-of-interest is displayed in the viewfinder based on the determined distance and direction of the object-of-interest with respect to the lens position. The processor may construct the custom reticle by scaling size information from an appropriate object template using the determined distance and direction of the object-of-interest with respect to the lens. The processor may store the apparatus's distance from the object-of-interest and the direction of the object-of-interest with respect to the lens in a table in the non-volatile, non-transitory memory.

A disclosed method of operation includes displaying a scene in a viewfinder, and providing a custom reticle in the viewfinder that defines a region-of-interest having a shape corresponding to an object-of-interest as the object-of-interest appears in the viewfinder. In some embodiments, the method may further include limiting usage of image statistics of a captured image, used by at least one of an auto exposure routine and an auto white balance routine, by using only the image statistics corresponding to grid areas falling within a perimeter defined by the custom reticle.

The method may further include constructing the custom reticle using an object template stored in memory. The object template includes location information and size information for the object-of-interest. The method may include determining that the object-of-interest is displayed in the viewfinder and, in response, constructing the custom reticle.

In some embodiments, the method may further include determining the apparatus's distance from the object-of-interest using location information of the apparatus obtained from location determination hardware and location information of the object-of-interest contained in the object template; determining the direction of the object-of-interest with respect to a lens of the camera equipment using a gyroscope; and determining that the object-of-interest is displayed in the viewfinder based on the determined distance and direction of the object-of-interest with respect to the lens position.

The method may further include scaling the object template size information using the determined distance and direction of the object-of-interest with respect to the lens and may also include storing the apparatus's distance from the object-of-interest and the direction of the object-of-interest with respect to the lens in a table.

The disclosed embodiments include another apparatus with camera equipment having one or more lenses and one or more camera sensors operative to detect at least three colors. A display is operatively coupled to the camera equipment and provides a viewfinder. A processor is operatively coupled to the camera equipment and to the display. The processor is configured to control the camera equipment and the display to position a reticle over an object-of-interest as the object-of-interest appears in the viewfinder by using location information obtained for the object-of-interest. The reticle is positioned automatically without requiring any user input.

The apparatus may further include non-volatile, non-transitory memory that is operatively coupled to the processor and that stores at least one object template. The object template includes the location information and size information for the object-of-interest. The processor may determine the orientation of a camera equipment lens with respect to an object-of-interest to determine that the object-of-interest is displayed in the viewfinder, and may, in response, construct a custom reticle for the object-of-interest.

The apparatus may include location determination hardware that is operatively coupled to the processor, and a gyroscope that is also operatively coupled to the processor. The processor can determine the apparatus's distance from the object-of-interest using location information of the apparatus obtained from the location determination hardware and location information of the object-of-interest contained in the object template. The processor can determine the direction of the object-of-interest with respect to the lens of the camera equipment using the gyroscope, and can determine that the object-of-interest is displayed in the viewfinder based on the determined distance and direction of the object-of-interest with respect to the lens position.

The processor may be configured to construct the custom reticle by scaling size information contained in an object template using the determined distance and direction of the object-of-interest with respect to the lens. The processor may store the apparatus's distance from the object-of-interest and the direction of the object-of-interest with respect to the lens in a table in the non-volatile, non-transitory memory.

Another disclosed method includes displaying a scene in a viewfinder on a display of an apparatus, and positioning a reticle in the viewfinder over an object-of-interest as the object-of-interest appears in the viewfinder. The may further include selecting the object-of-interest from a plurality of objects-of-interest displayed in the viewfinder, prior to positioning the reticle over the object-of-interest. These operations are performed automatically, without any input from the user. The method may also include determining the orientation of a camera equipment lens with respect to the object-of-interest to determine that the object-of-interest is displayed in the viewfinder.

Figure 2:
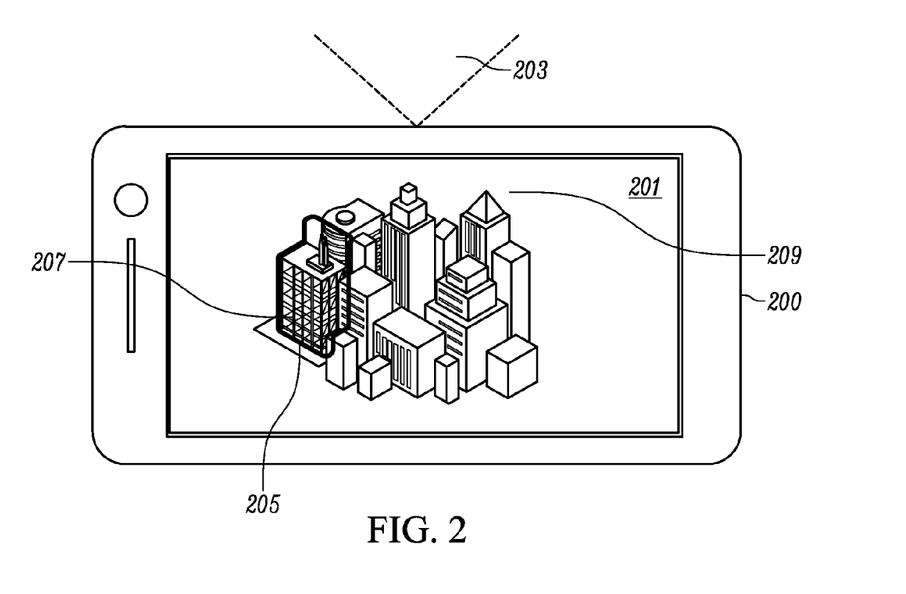
FIG. 2 is a diagram of a mobile device that has an integrated digital camera in accordance with the embodiments in which a customized focus reticle is constructed for an object-of-interest appearing in the viewfinder.

Turning now to FIG. 2 a mobile device 200 is illustrated that includes an integrated digital camera which operates in accordance with the embodiments. The mobile device 200 includes a display 201 that provides a viewfinder for the digital camera feature. The viewfinder is operative to display an image 209 of a scene captured by a lens and camera sensor within a field-of-view 203. A custom focus reticle 205 is constructed for an object-of-interest 207 and is moved across or about the image 209 in the viewfinder automatically and placed upon the object-of-interest 207, which is a building in a city skyline as illustrated by the example of FIG. 2.

Figure 3:
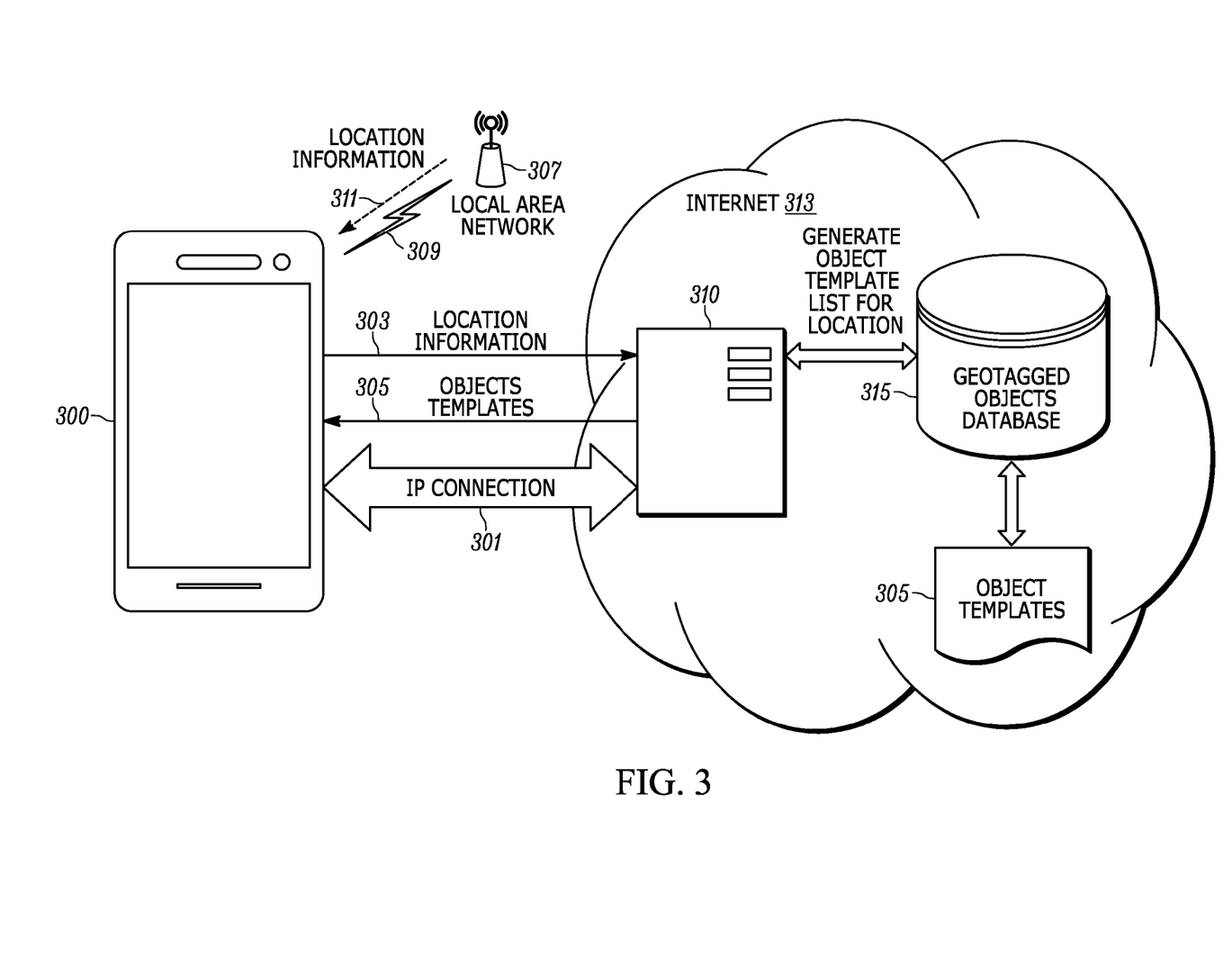
FIG. 3 is a diagram showing a mobile device with an integrated digital camera, communicating with a server to receive object templates in accordance with an embodiment.

FIG. 3 illustrates how a mobile device 300 with an integrated digital camera can communicate with a server 310 to receive object templates in accordance with an embodiment. When the mobile device 300 launches a camera application, a process is started to resolve the mobile device 300 location and to build a database of interesting location based objects-of-interest. In some embodiments, this process may be always running in the background which helps to improve the overall user experience.

The mobile device 300 may obtain location information from its internal location hardware (such as a Global Positioning System (GPS) chip) or may obtain location information 311 over a wireless link 309 from a wireless local area network 307. The mobile device establishes an Internet Protocol (IP) connection 301 with the server 310 and sends the server 310 the obtained location information 303. The IP connection 301 may be established over the WLAN wireless link 309 or over a wireless wide area network (WAN) such as a wireless telephone network. The server 310 includes or can access a geotagged objects database 315 which contains object templates 305 for various objects-of-interest. Objects-of-interest may be, for example, architectural objects such as buildings, statues or monuments, natural land formations, or any other object-of-interest that may be tied to a location. An object template contains at least size and shape information and location information for an object-of-interest. The object template may also contain color information, lighting or shading information or any other information that may be useful for focusing and capturing an image of the object-of-interest by a digital camera. In some embodiments, various object templates may be pre-stored based a location related to the mobile device 300 network service area. Additionally, or alternatively, object templates may be occasionally sent to the mobile device 300 by the server 310 as the mobile device 300 roams through different network location areas. These object templates may be created by participating mobile devices that are operative to create an object template at the time of image capture of an object-of-interest. These participating mobile devices geotag the object template and upload it to the server 310 for incorporation into the geotagged objects database 315.

The server 310 may generate an object template list for the location corresponding to the location information 303 and for a predetermined surrounding area. For example a surrounding area may be determined as a predetermined radius such as 10 miles, 20 miles, 30 miles, or some other radial distance etc. extending from the specified location coordinates. The surrounding distance need not be radial but could also be determined by a geometric shape such as a square or rectangle based on a grid pattern etc. The object templates 305 corresponding to the predetermined surrounding area are then sent to the mobile device 300 by the server 310.

After or as the mobile device 300 is receiving the object templates 305, the camera application resolves the camera lens direction and uses the mobile device 300 location information 303 to determine if there are any objects-of-interest in the scene. The camera application does this by reading the object templates' 305 location information to check if there are any objects-of-interest located in the direction the camera lens is pointing.

If any object-of-interest is found to be present in the scene (i.e. in the viewfinder), then a custom region-of-interest is then created and moved automatically to the location based object or objects in the scene. The custom region-of-interest can be designated to the mobile device 300 user by showing a custom reticle that has the shape of, and surrounds the perimeter of, the object-of-interest. Additionally, depending on the distance to the object, the lens may be adjusted directly to a calculated position or a focus sweep may be performed on one or more objects-of-interest.

Therefore, among other advantages of the disclosed embodiments, the mobile device 300 can make use of its location information 303 and location information for surrounding objects-of-interest to generate and automatically move a customized focus reticle and adjust the camera lens to an appropriate position.

Figure 4A:
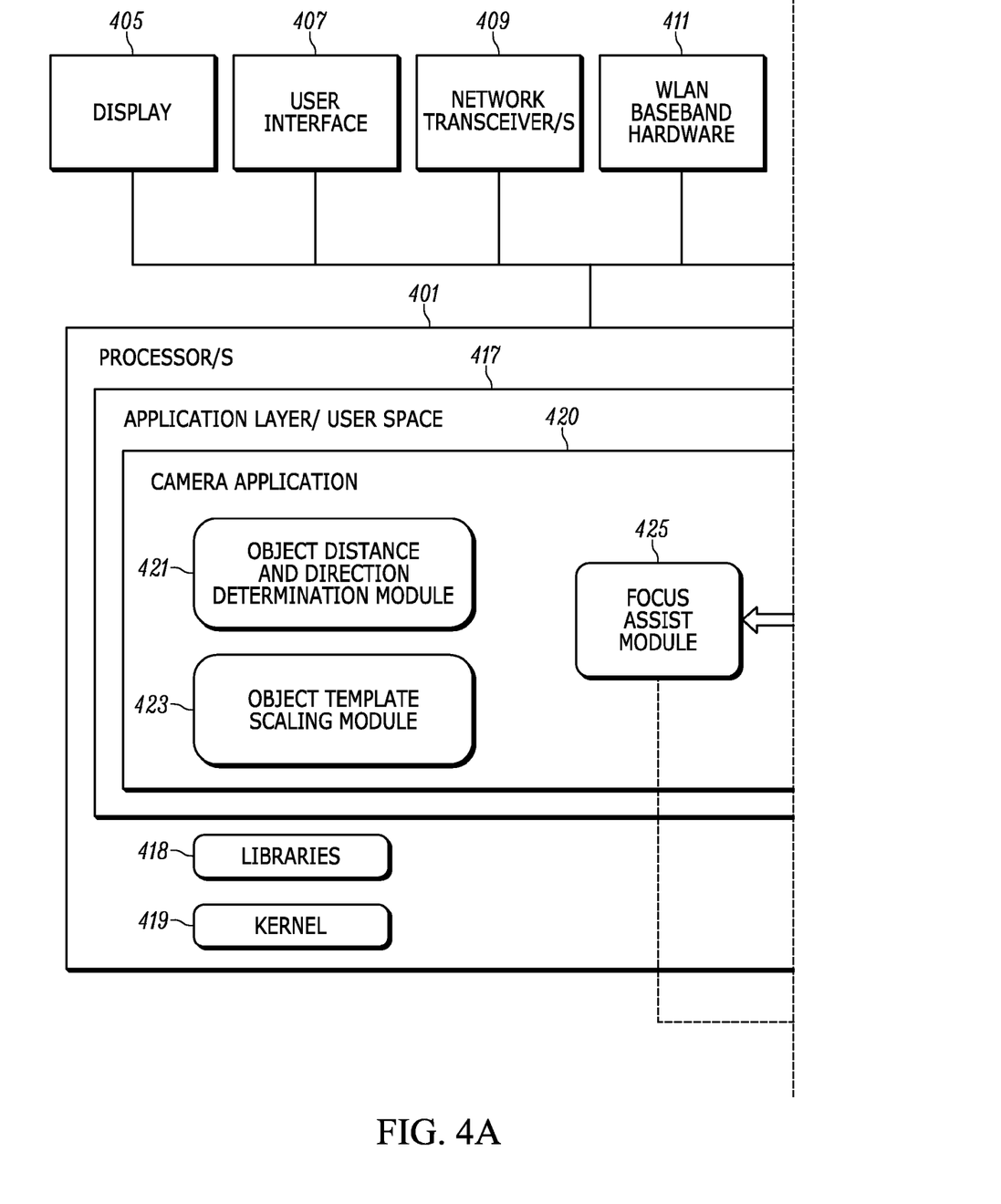
FIG. 4 is a block diagram of a mobile device with an integrated digital camera in accordance with various embodiments.
Figure 4B:
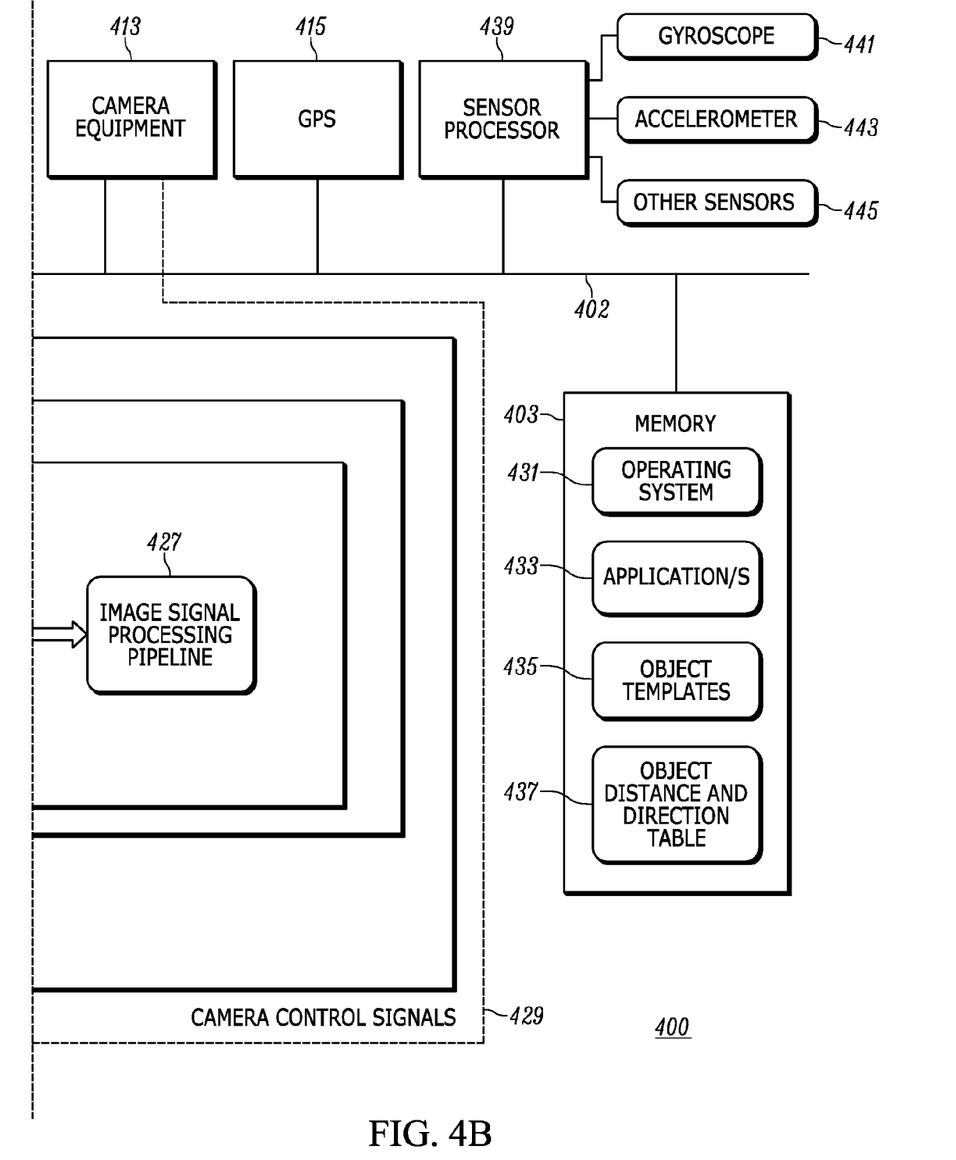

Further details of an embodiment are provided in FIG. 4 which is a block diagram of an example mobile device 400. In accordance with the example embodiment of FIG. 4, the mobile device 400 includes camera equipment 413 that is operative to capture and provide image frames to an image signal processing pipeline 427. The camera equipment includes at least one lens, a camera sensor that can detect at least three colors, and internal memory. The internal memory is non-volatile, non-transitory memory and contains camera unit calibration data and golden reference calibration data (which may also be referred to as "classic" calibration data) for the camera equipment 413. The camera equipment 413 calibration data includes white balance calibration data for the camera equipment 413 collected with respect to a reference such as a calibrated white card reference.

The mobile device 400 also includes one or more processors 401, display 405 which is used to provide a camera viewfinder, user interface 407, one or more wide area network transceivers 409 (such as, but not limited to CDMA, UMTS, GSM, etc.), WLAN baseband hardware 411, GPS hardware 415, and memory 403. All of the components shown are operatively coupled to the one or more processors 401 by one or more internal communication buses 402. In some embodiments, a separate sensor processor 439 monitors sensor data from various sensors including a gyroscope 441 and an accelerometer 443 as well as other sensors 445. The gyroscope 441 and accelerometer 443 may be separate or may be combined into a single integrated unit. In some embodiments, the mobile device 400 may include an eCompass that includes the accelerometer 443 and a magnetometer. The eCompass may be present as an alternative to the gyroscope 441 and accelerometer 443 or may be a separate additional component of the mobile device 400.

The memory 403 is non-volatile and non-transitory and stores executable code for an operating system 431 that, when executed by the one or more processors 401, provides an application layer (or user space) 417, libraries 418 (also referred to herein as "application programming interfaces" or "APIs") and a kernel 419. The memory 403 also stores executable code for various applications 433, object templates 435 and an objects distance and directions table 437. The one or more processors 401 are operative to launch and execute the applications 433 including a camera application 420 in accordance with the embodiments. The example camera application 420 may include an object distance and direction module 421, and object template scaling module 423 and a focus assist module 425. However it is to be understood that the camera application 420 can be implemented in other ways that are contemplated by the present disclosure and that the example shown in FIG. 4 is only one possible implementation. For example the object distance and direction determination module 421 and the object template scaling module 423 may be integrated together or may be integrated with the focus assist module 425 in some embodiments, etc. The memory 403 may be operatively coupled to the one or more processors 401 via the internal communications buses 402 as shown, may be integrated with the one or more processors 401, or may be some combination of operatively coupled memory and integrated memory.

In some embodiments, when the camera application 420 is launched, the WLAN baseband hardware 411 may scan for networks and attempt to obtain location information 311 if available. The camera application 420 may also access the GPS hardware 415 to obtain location information. Location information obtained over the WLAN may be an alternative in situations where GPS location information may not be available such as when indoors or other locations where GPS satellite data cannot be accessed. As another alternative, the camera application 420 may obtain location information from a WAN via the network transceivers 409 in some embodiments.

After obtaining location information from the GPS hardware 415, using a WLAN connection, using a WAN connection, or some combination of these, the camera application 420 may proceed in one of two ways. In some embodiments, the objects templates 435 may already be stored in memory 403 based on the previously known location of the mobile device 400, or may have been preloaded at the time of purchase of the mobile device 400. Otherwise, the mobile device 400 may obtain the object templates 435 (or an update of the object templates 435) by sending location information 303 to the server 310. Obtaining and sending the location information 303 is handled by the camera application 420 which can communicate with the GPS hardware 415 and the WLAN baseband hardware 411 over the internal communication buses 402.

The camera application 420 is operative to obtain the object templates 435 from the server 310 and to store them in the memory 403. The object templates 435 contain size and shape (i.e. dimensions), location information, and may also contain color and lighting information for various viewing angles in some embodiments, for various objects-of-interest. The various objects-of-interest are located within a geographic area surrounding the location of the mobile device 400.

The focus assist module 425 is operative to control camera equipment 413 by sending camera control signals 429 to adjust lens position. The object template scaling module 423 is operative to scale one or more object templates 435 using the mobile device 400 location information, an object-of-interests distance, and camera lens position such that a custom reticle can be generated for an object-of-interest shown on the display 405 (i.e. in the camera viewfinder). The camera application 420 is operatively coupled to the image signal processing pipeline 427 and to a camera equipment 413 automatic white balance (AWB) routine (not shown), automatic exposure control (AEC) routine (not shown) and auto-focus routine (not shown) using appropriate APIs (i.e. from libraries 418). The camera equipment AWB routine is operative to obtain auto white balance statistics from the image signal processing pipeline 427, and to provide white balance results as output. In some embodiments, the focus assist module 425 may also adjust the camera equipment 413 white balance results using information contained in the object templates 435.

In some embodiments, the camera application 420 may also play a role in building the geotagged objects database 315 and the object templates 305 stored therein. More particularly, the camera application 420 may from time-to-time communicate over the Internet 313 with the server 310 to send location information, and image data for objects-of-interest captured using the camera equipment 413. This may be facilitated by the object template scaling module 423 which may also be operative to define a template for an object-of-interest. In some embodiments, the object template scaling module 423 is operative to obtain object size and shape information as user input to the user interface 407 and display 409 (such as through a touchscreen feature). For example, in one embodiment, a user can use their finger (or a stylus) to draw a rough outline around a displayed object-of-interest in the camera viewfinder using a touchscreen display feature. The image signal processing pipeline is operative to perform edge detection to refine the size and shape for the object-of-interest template generation. In some embodiments, algorithms such as, but not limited to, Sobel filtering, Canny edge detection, etc., may be applied to further refine the size and shape. Regarding location information for an object-of-interest, the server 310 is operative to combine inputs received from various users to estimate the location of an object-of-interest through triangulation. In one example, if two users at different locations provide the same size information for an object-of-interest, then the server 310 may assume that the two users were at the same distance from the object-of-interest. Through triangulation, the location of the object can be estimated.

Any of the components shown in FIG. 4 including without limitation the camera application 420, object distance and direction determination module 421, object template scaling module 423, focus assist module 425 and/or the image signal processing pipeline 427 may be implemented as executable instructions executed by the one or more processors 401, or may be implemented as hardware, or as a combination of hardware and software/firmware. In embodiments in which one or more of these components is implemented as software, or partially in software/firmware, the executable instructions may be stored in the operatively coupled, non-volatile, non-transitory memory 403, that may be accessed by the one or more processors 401 as needed.

However, it is to be understood that any of the above described example components in the example mobile device 400 may be implemented as software (i.e. executable instructions or executable code) or firmware (or a combination of software and firmware) executing on one or more processors, or using ASICs (application-specific-integrated-circuits), DSPs (digital signal processors), hardwired circuitry (logic circuitry), state machines, FPGAs (field programmable gate arrays) or combinations thereof. Therefore the mobile device 400 illustrated in FIG. 4 and described herein provides just one example of a camera system embodiment and is not to be construed as a limitation on the various other possible implementations that may be used in accordance with the various embodiments.

More particularly, the object distance and direction determination module 421, object template scaling module 423, focus assist module 425 and/or the image signal processing pipeline 427 may be a single component or may be implemented as any combination of DSPs, ASICs, FPGAs, CPUs running executable instructions, hardwired circuitry, state machines, etc., without limitation. Therefore, as one example, the object distance and direction determination module 421 and the object template scaling module 423 may be integrated together and may be implemented using an ASIC or an FPGA that may be operatively coupled to a separate focus assist module 425 and to the image signal processing pipeline 427. Likewise the focus assist module 425 may be executed as code or may be implemented using an ASIC or an FPGA operatively coupled to the camera equipment 413 and/or to the image signal processing pipeline 427 where the focus assist module 425 is also implemented using an ASIC or an FPGA. These example embodiments and other embodiments are contemplated by the present disclosure.

Figure 5:
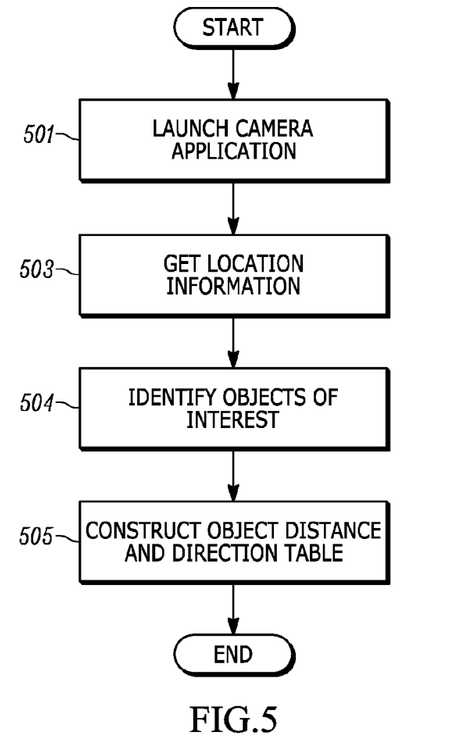
FIG. 5 is a flow chart showing an operation of a mobile device with an integrated digital camera in accordance with various embodiments.
Figure 6:
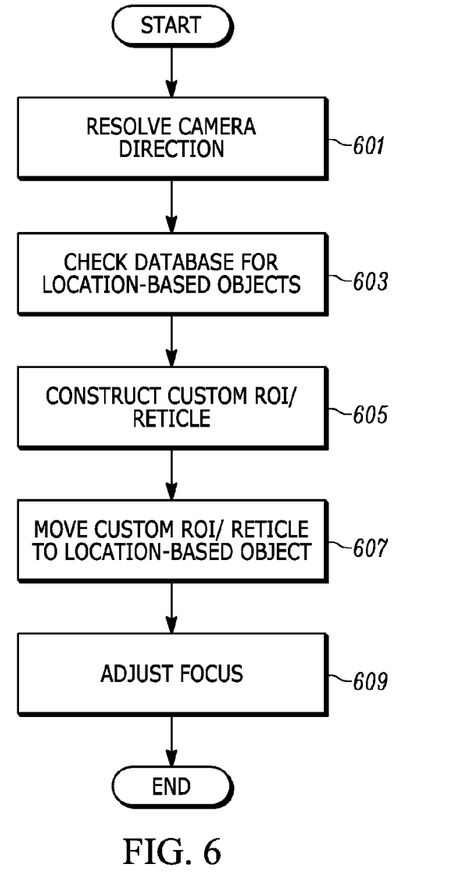
FIG. 6 is a flow chart showing operation another operation of a mobile device with an integrated digital camera in accordance with various embodiments.
Figure 7:
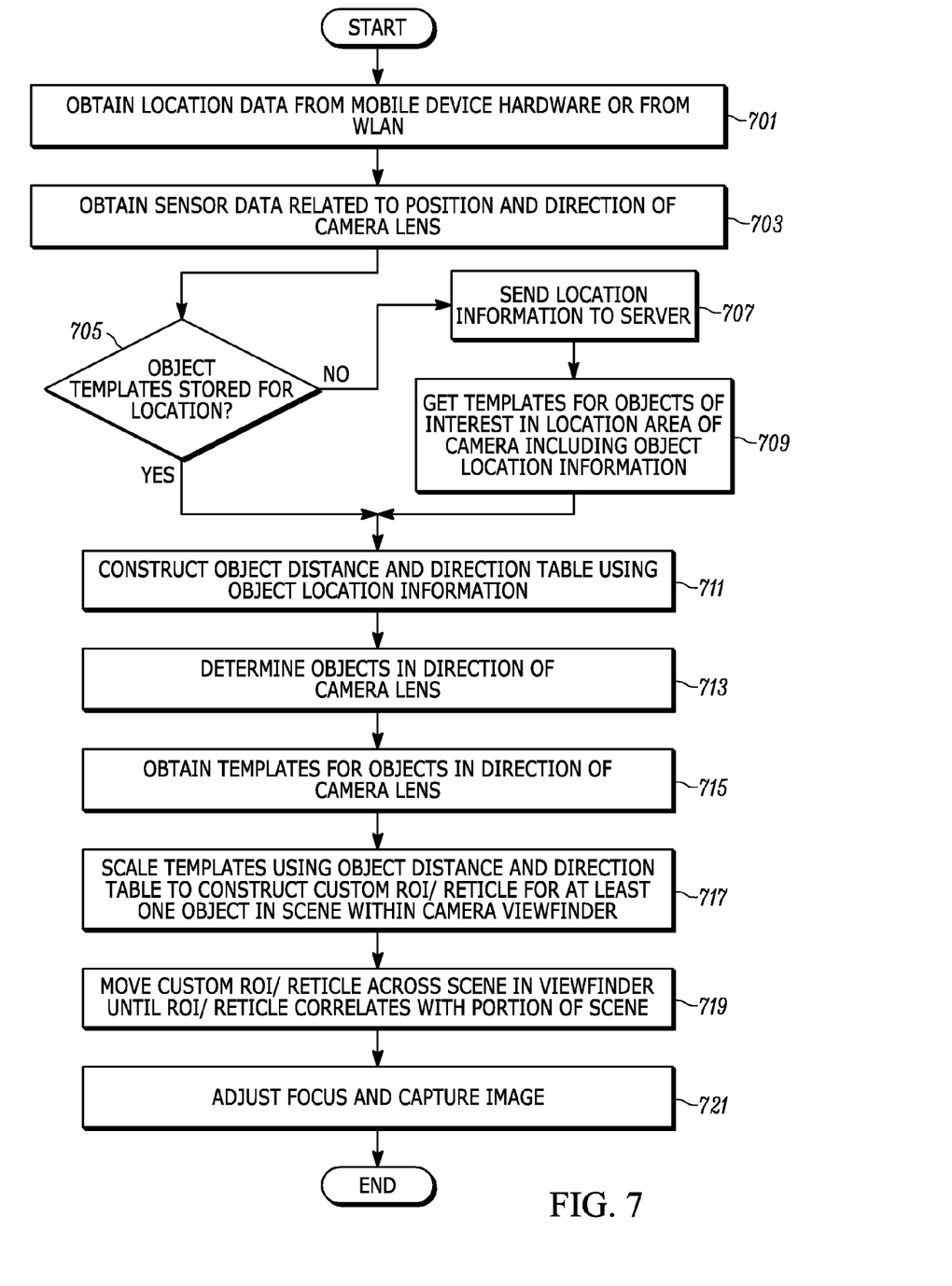
FIG. 7 is a flow chart showing an operation of a mobile device with an integrated digital camera in accordance with various embodiments.

The various operations of the example mobile device 300 shown in FIG. 3 and example mobile device 400 shown in FIG. 4 are best understood in conjunction with the flowcharts of FIG. 5, FIG. 6 and FIG. 7. Turning to FIG. 5, in operation block 501, the camera application 420 is launched and executed by the one or more processors 401 within the user space 417. In operation block 503, the one or more processors 401 obtain location information for the mobile device 400. This is accomplished either by accessing the GPS hardware 415, or by obtaining location information from a WLAN using the WLAN baseband hardware 411. In operation block 504 the one or more processors 401 access object templates 435 stored in memory 403 and identify any objects-of-interest which may be present in the camera viewfinder shown on the display 405.

By using object-of-interest location information contained in the object templates 435, and the mobile device 400 location information obtained in operation block 503, the one or more processors 401 construct or update the object distance and direction table 437 and store the new or updated object distance and direction table 437 in memory 403. The object distance and direction table 437 is constructed as shown in operation block 505 and the process then ends.

Turning to FIG. 6, in operation block 601, the one or more processors 401 resolve the camera's direction. This is done using sensor data along with the location information obtained from either from the GPS hardware 415, WAN, or from a WLAN using the WLAN baseband hardware 411. The one or more processors 401 are operative to communicate with the sensor processor 439 and obtain sensor data from the gyroscope 441 and the accelerometer 443 (or from an eCompass component). The one or more processors 401 then execute a compass operation and determine the direction in which a lens of the camera equipment 413 is pointing. Once the determination of the camera's direction is made in operation block 601, the process proceeds to operation block 603. In operation block 603, the one or more processors 401 check the object templates 435 and use the contained object location information to determine which objects-of-interest are located in the direction the camera lens is pointing. These objects-of-interest will therefore appear within the camera viewfinder displayed on display 405.

In operation block 605, the one or more processors 401 proceed to construct a custom region-of-interest which is demarcated by a customized focus reticle. The one or more processors 401 obtain size and shape information for the objects-of-interest from the object templates 435, and construct the custom reticle by appropriately scaling the size and shape to fit about the object-of-interest as displayed within the camera viewfinder. In order to scale the object template size and shape, the one or more processors 401 also access and use the object distance and direction table 437 which was generated by the one or more processors 401 during the process discussed above with respect to FIG. 5.

In operation block 607, the one or more processors 401 control the camera equipment 413 and the display 405 such that the custom reticle is automatically moved across the scene in the viewfinder and positioned upon the object-of-interest. In operation block 609, the one or more processors 401 may further control the camera equipment 413 to adjust lens focus by adjusting the lens position according to the determined distance of the object-of-interest stored in the objects distance and direction table 437. The process then ends as shown.

The flow chart of FIG. 7 illustrates operations of the object distance and direction determination module 421, the object template scaling module 423 and the focus assist module 425. In operation block 701, the object distance and direction determination module may obtain location data from the mobile device hardware (i.e. the GPS hardware 415, WAN network transceivers 409 or from a WLAN via the WLAN baseband hardware 411). In operation block 703, the object distance determination module may also communicate with the sensor processor 439 to obtain sensor data from the gyroscope 441 and from the accelerometer 443, from an eCompass or a combination of such sensors. The sensor data is used, along with the location data, to determine the position and direction of a camera lens of the camera equipment 413. The object distance and direction determination module 421 is operative to access any needed APIs from libraries 418 in order to communicate with the sensor processor 439, the GPS hardware 415 and/or the WLAN baseband hardware 411.

In decision block 705, the object distance and direction determination module 421 checks the memory 403 to see if object templates are present or if any existing object templates 435 define objects within the geographic area indicated by the mobile device 400 location. If no object templates for the location are stored in the memory 403 then, in operation block 707, the object distance and direction determination module 421 sends the location information to the server 310. In operation block 709, in response to sending the location information, the object distance and direction determination module 421 obtains new object templates for objects-of-interest based on the location of the mobile device 400. The new object templates 435 are then stored in memory 403. The object templates 435 include location information, size and shape, and other information for the objects-of-interest in a predetermined geographic area related to the mobile device 400 coordinates.

The object templates 435 may include any information related to the objects-of-interest such as, but not limited to, location coordinates; other location information such as country, city, state town, etc.; object name; object historical information; or any other information related to the object-of-interest.

The process then proceeds to operation block 711. Likewise, if in decision block 705 the object distance and direction determination module 421 determines that object templates 435 are present in memory 403 and that they include object templates relevant for the location of the mobile device 400, the process also proceeds to operation block 711. In operation block 711, the object distance and direction determination module 421 uses the mobile device 400 location and the location information in the object templates 435 to construct an object distance and direction table 437 and store the table in memory 403.

In operation block 713, the object distance and direction determination module 421 determines if any objects-of-interest are located in the direction of the camera lens using object distance and direction table 437, mobile device 400 location information obtained in operation block 701, and the sensor data obtained in operation block 703. More particularly, the object distance and direction determination module 421 uses the gyroscope 441 data and accelerometer 443 data to determine the mobile device 400 orientation in space. The location of the camera lens within the camera equipment 413 is known along with the mobile device 400 location, therefore the orientation of the camera is used to determine the direction of the camera lens. By reading the object distance and direction table 437, which was constructed earlier, the object distance and direction determination module 421 can identify the objects-of-interest in the camera lens direction. Barring any intervening objects or persons blocking the camera lens, these objects-of-interest will appear in the camera viewfinder foreground or background if the lens is partially blocked.

In operation block 715, the object distance and direction determination module 421 accesses the object templates 435 and selects any templates for objects-of-interest located in the direction of the camera lens. These templates can then be handed over to the object template scaling module 423. In operation block 717, the object template scaling module 423 scales the selected object templates using the object distance and direction table 437 and constructs a custom reticle for at least one object-of-interest in the scene within the camera viewfinder.

In operation block 719, the focus assist module 425 may then move the custom reticle across the scene in the viewfinder (i.e. on the display 405), until the custom reticle correlates with a portion of the scene. In operation block 721, the focus assist module 425 may accordingly send camera control signals 429 to the camera equipment 413 to adjust focus and capture the image. The method of operation then ends as shown.

The user may override the automatic selection of the object-of-interest by manually selecting one or more different objects-of-interest in the viewfinder. This may be done using a touchscreen feature or mouse selection etc. of the display 405 or using some other feature of the user interface 407. In that case, the object template scaling module 423 will select and scale the appropriate object template (from object templates 435) based on the user's selection and will construct a new custom reticle. The focus assist module 425 will position the new reticle over the user's selection.

Figure 8:
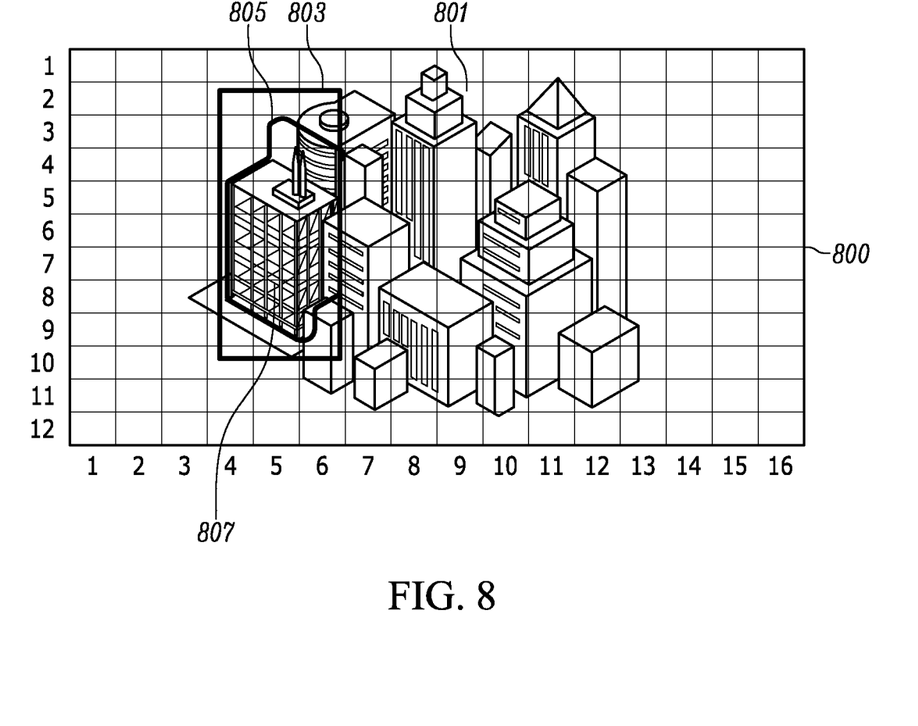
FIG. 8 is a diagram of a digital camera viewfinder illustrating the partitioning of a captured image into a grid for purposes of image statistics collection and in which a customized focus reticle overlaps one or more grid areas.

FIG. 8 is a diagram of a digital camera viewfinder illustrating the partitioning of a captured image into a grid for purposes of image statistics collection and in which a customized focus reticle overlaps one or more grid areas. More particularly, the focus assist module 425 may communicate with the image signal processing pipeline 427 and may improve processing speed by limiting the statistics required to perform focus operations. In the example shown in FIG. 8, a scene 801 contained within the viewfinder is broken into a 16×12 grid 800 over the field of view of the camera equipment 413. As understood by those of ordinary skill, each block within the grid 800 contains a focus score or focus metric that may be used by various routines performed within or externally to the image signal processing pipeline 427 as part of the image capture processes.

A custom reticle 805 surrounds the perimeter of an object-of-interest 807 which in this example is a skyscraper. This information to be used by the focus assist module 425 to limit which portions of the grid 800 statistics are used for processes of the image signal processing pipeline 427 or any external processes that use the statistics. For example, as shown in FIG. 8, the focus assist module 425 may limit the statistics used to the grid 800 grid blocks defined by a rectangle 803 having corners at column four, row three and column six, row nine. The rectangle 803 encompasses the custom reticle 805 around the object-of-interest 807 and therefore limits the statistics used to a smaller region-of-interest than the entire scene 801. The focus assist module 425 may access an API through the libraries 418 to instruct the image signal processing pipeline 427 to limit the statistics utilized to the specified portion of the grid 800. The limited statistics may be also be used for the camera equipment 413 AWB and automatic exposure control (AEC) routines. Although the example of FIG. 8 uses a rectangle 803 to define a limited statistics region-of-interest, any shape may be used for this purpose in accordance with the embodiments.

In some embodiments, the focus assist module 425 may also be used to maintain focus on an object-of-interest to improve image quality when capturing a panoramic view. For example, as the camera equipment 413 sweeps across the scene in order to form the panoramic view, the focus assist module 425 may maintain focus on one or more objects-of-interest defined within a customized focus reticle.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. An apparatus, comprising:
camera equipment comprising one or more lenses and one or more camera sensors operative to detect at least three colors;
a display, operatively coupled to the camera equipment, and operative to provide a viewfinder that can display a scene sensed by the camera sensors of the camera equipment;
non-volatile, non-transitory memory, having location information and size information for an object-of-interest stored therein; and
a processor, operatively coupled to the camera equipment, the memory and to display, and configured to:
construct a custom reticle using the location information and size information for the object-of-interest; and
control the camera equipment and the display to provide the custom reticle that defines a region-of-interest having a shape corresponding to the object-of-interest as the object-of-interest appears in the viewfinder.

2. The apparatus of claim 1, wherein the processor is further configured to:
limit usage of image statistics of a captured image, used by at least one of an auto exposure routine and an auto white balance routine, by using only the image statistics corresponding to grid areas falling within a perimeter defined by the custom reticle.

3. The apparatus of claim 1, further comprising:
an object template, stored in the non-volatile, non-transitory memory, the object template comprising the location information and the size information for the object-of-interest; and
wherein the processor is further configured to:
construct the custom reticle using the object template.

4. The apparatus of claim 3, wherein the processor is further configured to:
determine that the object-of-interest is displayed in the viewfinder; and
construct the custom reticle in response to determining that the object-of-interest is displayed in the viewfinder.

5. The apparatus of claim 4, further comprising:
location determination hardware, operatively coupled to the processor;
a gyroscope, operatively coupled to the processor; and
wherein the processor is further configured to:
determine the apparatus's distance from the object-of-interest using location information of the apparatus obtained from the location determination hardware and location information of the object-of-interest contained in the object template;
determine the direction of the object-of-interest with respect to a lens of the camera equipment using the gyroscope; and
determine that the object-of-interest is displayed in the viewfinder based on the determined distance and direction of the object-of-interest with respect to the lens position.

6. The apparatus of claim 5, wherein the processor is further configured to:
construct the custom reticle by scaling the at least one object template size information using the determined distance and direction of the object-of-interest with respect to the lens.

7. The apparatus of claim 5, wherein the processor is further configured to store the apparatus's distance from the object-of-interest and the direction of the object-of-interest with respect to the lens in a table in the non-volatile, non-transitory memory.

8. A method, comprising:
displaying a scene in a viewfinder on a display of an apparatus, the scene sensed using camera sensors and at least one lens of a camera equipment of the apparatus;

constructing a custom reticle for an object-of-interest using location and size information for the object-of-interest; and providing the custom reticle in the viewfinder that defines a region-of-interest having a shape corresponding to the object-of-interest as the object-of-interest appears in the viewfinder.

9. The method of claim 8, further comprising:

limiting usage of image statistics of a captured image, used by at least one of an auto exposure routine and an auto white balance routine, by using only the image statistics corresponding to grid areas falling within a perimeter defined by the custom reticle.

10. The method of claim 8, further comprising:

constructing the custom reticle using an object template stored in memory, the object template comprising the location information and the size information for the object-of-interest.

11. The method of claim 10, further comprising:

determining that the object-of-interest is displayed in the viewfinder; and constructing the custom reticle in response to determining that the object-of-interest is displayed in the viewfinder.

12. The method of claim 11, further comprising:

determining the apparatus's distance from the object-of-interest using location information of the apparatus obtained from location determination hardware and location information of the object-of-interest contained in the object template;

determining the direction of the object-of-interest with respect to a lens of the camera equipment using a gyroscope; and determining that the object-of-interest is displayed in the viewfinder based on the determined distance and direction of the object-of-interest with respect to the lens position.

13. The method of claim 12, further comprising:

scaling the object template size information using the determined distance and direction of the object-of-interest with respect to the lens.

14. The method of claim 12, further comprising:

storing the apparatus's distance from the object-of-interest and the direction of the object-of-interest with respect to the lens in a table.

15. An apparatus, comprising:

camera equipment comprising one or more lenses and one or more camera sensors operative to detect at least three colors;

a display, operatively coupled to the camera equipment, and operative to provide a viewfinder that can display a scene sensed by the camera sensors of the camera equipment;

non-volatile, non-transitory memory, having location information and size information for an object-of-interest stored therein; and a processor, operatively coupled to the camera equipment, the memory and to the display, and configured to:

construct a custom reticle using the location information and the size information for the object-of-interest; and control the camera equipment and the display to position the custom reticle over the object-of-interest as the object-of-interest appears in the viewfinder.

16. The apparatus of claim 15, further comprising:

an object template stored in the non-volatile, non-transitory memory, the object template comprising the location information and the size information for the object-of-interest; and wherein the processor is further configured to:

determine the orientation of a camera equipment lens with respect to the object-of-interest to determine that the object-of-interest is displayed in the viewfinder.

17. The apparatus of claim 16, wherein the processor is further configured to:

construct a custom reticle for the object-of-interest in response to determining that the object-of-interest is displayed in the viewfinder.

18. The apparatus of claim 17, further comprising:

location determination hardware, operatively coupled to the processor;

a gyroscope, operatively coupled to the processor; and wherein the processor is further configured to:

determine the apparatus's distance from the object-of-interest using location information of the apparatus obtained from the location determination hardware and location information of the object-of-interest contained in the object template;

determine the direction of the object-of-interest with respect to the lens of the camera equipment using the gyroscope; and determine that the object-of-interest is displayed in the viewfinder based on the determined distance and direction of the object-of-interest with respect to the lens position.

19. The apparatus of claim 18, wherein the processor is further configured to:

construct the custom reticle by scaling the at least one object template size information using the determined distance and direction of the object-of-interest with respect to the lens.

20. The apparatus of claim 18, wherein the processor is further configured to store the apparatus's distance from the object-of-interest and the direction of the object-of-interest with respect to the lens in a table in the non-volatile, non-transitory memory.

21. A method, comprising:

displaying a scene in a viewfinder on a display of an apparatus, the scene sensed using camera sensors and at least one lens of camera equipment of the apparatus;

constructing a custom reticle for an object-of-interest using location information and size information for the object of interest; and positioning the custom reticle in the viewfinder over the object-of-interest as the object-of-interest appears in the viewfinder.

22. The method of claim 21, further comprising:

selecting the object-of-interest from a plurality of objects-of-interest displayed in the viewfinder, prior to positioning the reticle over the object-of-interest.

23. The method of claim 21, further comprising:

determining the orientation of a camera equipment lens with respect to the object-of-interest to determine that the object-of-interest is displayed in the viewfinder.

* * * * *